(12) United States Patent
Haggstrom

(10) Patent No.: US 6,888,074 B2
(45) Date of Patent: May 3, 2005

(54) COMPRESSION COLUMN LOAD CELL

(75) Inventor: Rolf P. Haggstrom, Sudbury, MA (US)

(73) Assignee: The Flintec Group, Ltd., Wan Chai (HK)

( * ) Notice: Subject to any disclaimer, the term of this patent is extended or adjusted under 35 U.S.C. 154(b) by 104 days.

(21) Appl. No.: 10/457,551

(22) Filed: Jun. 10, 2003

(65) Prior Publication Data

US 2004/0251059 A1 Dec. 16, 2004

(51) Int. Cl.⁷ .................... G01G 23/01; G01L 1/22
(52) U.S. Cl. ............. 177/211; 73/1.15; 73/862.622; 73/862.627; 73/862.631
(58) Field of Search ............... 177/211, 229; 73/1.15, 862.627, 862.631, 862.636, 862.628, 862.622

(56) References Cited

U.S. PATENT DOCUMENTS

| | | | | |
|---|---|---|---|---|
| 2,458,481 A | | 1/1949 | Ruge | 73/862.622 |
| 3,034,346 A | * | 5/1962 | Starr | 73/862.622 |
| 3,105,564 A | * | 10/1963 | Ormond | 177/211 |
| 3,228,240 A | * | 1/1966 | Ormond | 73/862.622 |
| 3,358,501 A | * | 12/1967 | Ormond | 73/862.622 |
| 3,576,128 A | | 4/1971 | Lockery | 73/862.622 |
| 3,621,927 A | * | 11/1971 | Ormond | 177/211 |
| 3,968,676 A | | 7/1976 | Ormond | 73/1.15 |
| 3,968,683 A | | 7/1976 | Ormond | 73/862.622 |
| 3,969,935 A | * | 7/1976 | Shoberg | 73/862.629 |
| 4,342,217 A | * | 8/1982 | Paetow | 73/1.15 |
| 4,380,175 A | | 4/1983 | Griffen | 73/862.622 |
| 4,428,976 A | * | 1/1984 | Eisele et al. | 427/96.2 |
| 4,804,053 A | | 2/1989 | Nordstrom | 177/211 |
| 4,958,526 A | | 9/1990 | Haggstrom | 73/862.622 |
| 5,610,343 A | | 3/1997 | Eger et al. | 73/862.628 |
| 6,098,464 A | | 8/2000 | Avisse et al. | 73/708 |

\* cited by examiner

*Primary Examiner*—Randy W. Gibson

(57) ABSTRACT

Simple and inexpensive electrical compensation for off-axis and off-center loading sensitivity is possible in compression column load cells comprising a pair of compensation strain gages in series with each of the main strain gages in the load cell. The compensation gages are arranged crosswise to each associated main strain gage, and connected in series with their associated main strain gage. Each set of one main strain gage and two series connected compensation gages form one bridge arm in a strain gage bridge. Two compensation gages meet at each bridge corner, and are shunted by a common trimming resistor. The loading sensitivity compensation works for both conventional fixed axis load cells and Rocker Pin load cells.

6 Claims, 2 Drawing Sheets

COMPRESSION COLUMN LOAD CELL

BACKGROUND OF THE INVENTION

1. Field of the Invention

The present invention relates to strain gage load cells, and more particularly to compression column load cells, both fixed axis and Rocker Pin load cells, with means for eliminating errors caused by off center loading of the compression column.

2. Description of the Related Art

A compression column load cell is the original design of a strain gage load cell. It comprises a compression column with a fixed vertical axis and a small radius spherical load button on top.

A Rocker Pin load cell is a special form of compression column load cell, in which the compression column is fitted with large radius spherical surfaces on both ends, so the load cell column can act as a self stabilizing rocker pin between parallel top and bottom loading surfaces. The Rocker Pin load cell was first described in U.S. Pat. No. 4,804,053. Since then, Rocker Pin load cells have been used extensively as load cells for truck scales and other high accuracy, heavy duty weighing applications.

All compression column load cells are basically columns of load cell quality material, such as steel or aluminum alloys, with strain gages bonded symmetrically around the compression columns near the midpoint of the columns, and fitted with housings or sealing bellows. The cross section of the compression column where the strain gages are bonded is usually square. Strain gages aligned with the longitudinal axis of a column are bonded to a first pair of opposing faces of the column to measure longitudinal strain, and strain gages aligned crosswise to the axis are bonded to the remaining pair of opposing faces of the column to measure transverse strain. The four strain gages are connected in a bridge circuit, which provides an electrical output signal used as a measure of the load on the load cell.

The four strain gages on a compression column usually have slightly different sensitivity to strain, and the strains on opposing side faces of a compression column are slightly different because of lack of perfect mechanical symmetry or off-axis loading of the compression column. The accuracy of the output signal from a compression column load cell will thus be impaired when the load cell is subject to off-center or off-axis loads. High accuracy load cells must accordingly be compensated for sensitivity to off-axis loading during calibration of the load cell.

The compensation for loading dependent errors is commonly done by filing of the compression column to restore symmetry. This is a time consuming and messy procedure, which requires skilled craftsmen. Attempts have been made to compensate for loading dependent errors by shunting individual strain gages or half-bridges in the strain gage bridge, but this process is also complicated. Compensation across the longitudinal and the transverse strain gage pairs affect each other, and the shunting resistors for compensation interact with the zero adjustment of the load cell, even if a balanced zero compensation is used.

SUMMARY OF THE INVENTION

An aspect of the present invention is to provide a compression column load cell that can be quickly and easily compensated for sensitivity to off-axis loading by means of trimming resistors.

Another aspect of the present invention is to provide a compression column load cell that can be compensated for loading errors and zero adjusted without significant interaction between the two adjustments.

Aspects of the invention are obtained by a compression column load cell which comprises a pair of low resistance strain gages aligned crosswise to each main strain gage on the compression column and connected in series with each main strain gage in each arm of the strain gage bridge circuit.

Additional aspects and advantages of the invention will be set forth in part in the description below and, in part, will be obvious from the description, or may be learned by practice of the invention. The aspects and advantages of the invention may be realized and obtained by means of the instrumentalities and combinations particularly pointed out in the appended claims

BRIEF DESCRIPTION OF THE DRAWINGS

The accompanying drawings, which are incorporated in and constitute part of the specification, illustrate embodiments of the invention and, together with the description, serve to explain the principles of the invention.

DETAILED DESCRIPTION OF PREFERRED EMBODIMENTS

Reference will now be made in detail to the embodiments of the present invention, examples of which are illustrated in the accompanying drawings, wherein like reference numbers refer to like elements throughout. The embodiments are described below in order to explain the present invention by referring to the figures.

Figure 1:
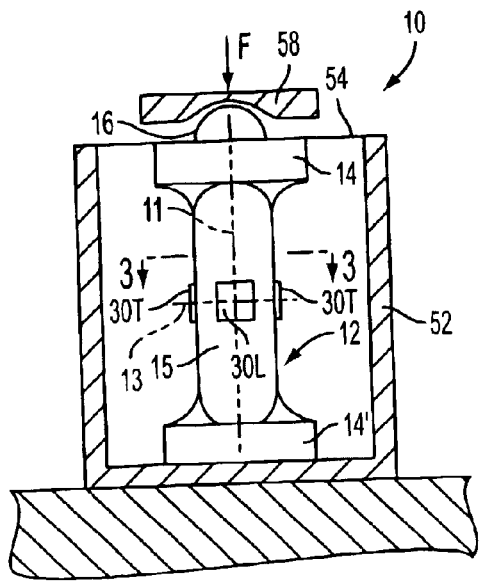
FIG. 1 is a simplified side view of a conventional compression column load cell with fixed axis, partially in section.
Figure 3:
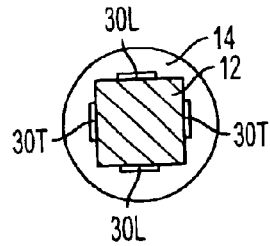
FIG. 3 is a cross section view along lines 3—3 of the compression columns of the load cells shown in FIGS. 1 and 2.

FIG. 1 is a simplified side view of a conventional compression column load cell 10, comprising a compression column 12 with a vertical axis 11 and a central plane 13. The compression column 12 is machined from load cell quality steel or aluminum alloy, and mounted in a cylindrical housing 52, which is shown in vertical section. The center section 15 of the load cell column 12 has a square cross section, as shown in FIG. 3. Strain gage elements 30L, 30T are bonded to each side face of the center section 15 as indicated in FIGS. 1 and 3. The top and bottom ends 14, 14' of the compression column 12 are thicker than the center section 15, and are cylindrical.

The bottom surface of the lower thick end 14' is flat and rests on the bottom of the housing 52. The top of the load cell column 12 is fitted with a semi-spherical load button 16, which is loaded via a cup-shaped loading plate 58. The column 12 is held in vertical alignment by a membrane 54, which is welded to the thick cylindrical section 14 and the top of the housing 52. The membrane 54 is weak in the axial direction of the load cell 10. Wiring between the strain gage elements 30L, 30T and external load cell terminals pass via seals in the wall of the housing. These details are not shown in FIG. 1.

Figure 2:
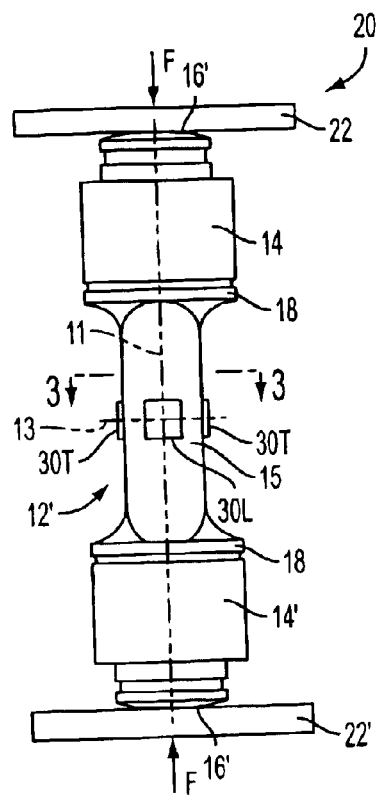
FIG. 2 is a simplified side view of a Rocker Pin load cell.

FIG. 2 is a simplified side view of a Rocker Pin load cell 20 with an axis 11 and a central plane 13, mounted vertically between a horizontal top loading plate 22 and a horizontal bottom loading plate 22'. The load cell 20 comprises a compression column 12', which is machined from load cell quality steel or aluminum alloy. It has a square center section 15 as shown in FIG. 3, and spherical rocking surfaces 16' at both ends. Strain gage elements 30L and 30T are bonded to the side surfaces of the center section 15 as indicated in FIGS. 2 and 3. Thicker end sections 14, 14' will in an actual load cell have channels for wiring and pockets for external connectors, as well as stops for anti-rotation elements, but these details are not shown in the simplified FIG. 2. A tubular sealing bellows will be welded to cylindrical flanges 18, but this is also omitted from the simplified FIG. 2.

When a compression column load cell 10 or 20 is loaded with a force F as shown, the column 12, 12' is compressed. Each of the four side surfaces of the square center section 15 will have a principal compression strain in the longitudinal direction, and a principal tension strain in the transverse direction. The transverse strain=v×the longitudinal strain, where Poisson's factor v=0.3 for steel.

Figure 4A:
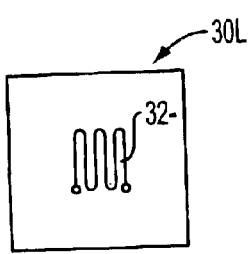
FIG. 4a is a simplified drawing of a longitudinally oriented strain gage element according to the prior art.
Figure 4B:
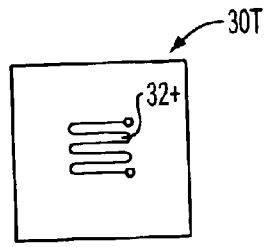
FIG. 4b is a simplified drawing of a transversally oriented strain gage element according to the prior art.
Figure 5:
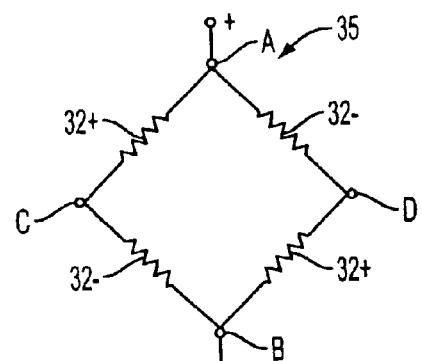
FIG. 5 is a simplified diagram of a strain gage bridge circuit for a compression column load cell according to the prior art.

For the type of load cells 10 or 20, in the prior art the strain gage elements 30L comprise strain gages 32− oriented as shown in FIG. 4a to measure longitudinal compression strain, and the strain gage elements 30T comprise strain gages 32+ oriented as shown in FIG. 4b to measure transverse tension strain. The + and − signs on the strain gages 32 indicate that the resistance of a strain gage 32 sensing tension strain increases with the load F, while the resistance of a strain gage 32 sensing compression strain decreases with the load F. The four strain gages 32 in a prior art load cell 10 or 20 are connected in a bridge circuit 35, as shown in FIG. 5, with power supply terminals A–B and output terminals C–D. Modulus compensation gages and linearizing elements connected in series with the power terminals A–B, as well as calibration resistors and resistors for zero adjustment resistors connected to the output terminals C–D are omitted in the simplified bridge circuit diagram shown in FIG. 5.

Figure 10:
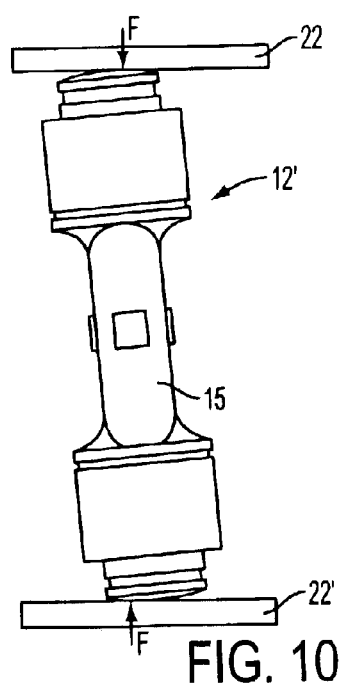
FIG. 10 is a simplified side view of a tilted Rocker Pin load cell between parallel top and bottom loading plates.
Figure 11:
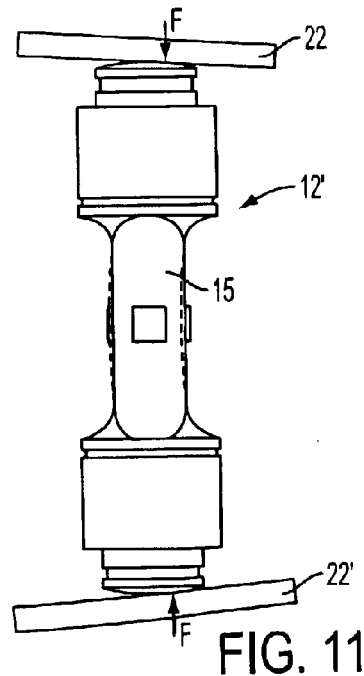
FIG. 11 is a simplified side view of a vertical Rocker Pin load cell between non-parallel top and bottom loading plates.

In actual Rocker Pin load cell applications, the Rocker Pin 20 may be tilted during weighing as indicated in FIG. 10, or squeezed between loading plates 22, 22" that are not horizontal, as indicated in FIG. 11. The bending of the compression column 12' in a Rocker Pin load cell 20 loaded as shown in FIG. 11 is indicated in FIG. 11 by much exaggerated dotted outlines. Loading plates 22, 22' that are only 1° off horizontal may cause so much bending stress in the center section 15 that the principal strains on one surface of the center section 15 can be twice the normal strain, while the strain in the other surface is reduced to zero. Lateral force components on the loading button 16 in a load cell 10 and tilting of a Rocker Pin load cell 20 cause smaller, but still significant, differences in the strain distribution on the center section 15.

If load cells 10 or 20 were perfectly symmetrical, the output signal at terminals C–D of the strain gage bridge shown in FIG. 5 would be insensitive to off-center and off-axis loading. In practice there will be unavoidable errors in symmetry caused by mechanical tolerances and by strain gage tolerances, so the output signal will show so called loading errors. The method used for compensating such errors has been filing of the load cell column to restore symmetry. Known methods for electrical compensation of other types of load cells have not been successful for compression column load cells.

Figure 6:
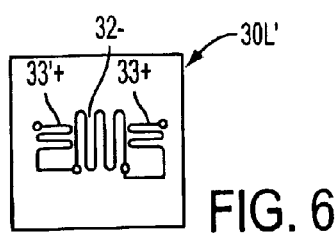
FIG. 6 is a simplified drawing of a longitudinally oriented composite strain gage element according to an embodiment of the invention.
Figure 7:
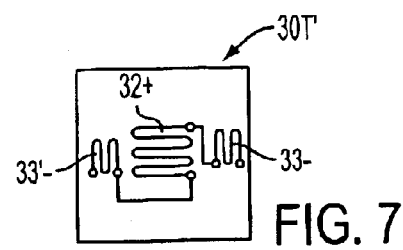
FIG. 7 is a simplified drawing of a transversally oriented composite strain gage element according to an embodiment of the invention.

The cost and complexity of compensating for sensitivity to off-axis and off-center loading can be greatly reduced with load cells according to embodiments of the invention. Load cells according to embodiments of the invention are mechanically identical to prior art load cells 10, 20, but a pair of compensation strain gages 33, 33' are added to each strain gage 32 bonded to the center section 15. An embodiment of a composite longitudinal strain gage elements 30L' is shown in FIG. 6, and an embodiment of a composite transversal strain gage element 30T' is shown in FIG. 7. The compensation strain gages 33, 33' are connected in series with each main strain gage 32, and are arranged crosswise to the main strain gage 32, so their resistance changes oppose the resistance changes in the main strain gage 32. The resistance of each compensation strain gage 33, 33' may be as low as 1–2% of the resistance of the main strain gage 32.

Figure 9:
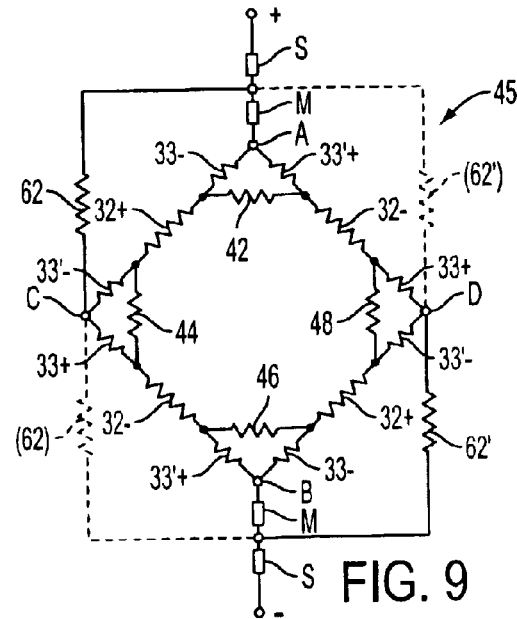
FIG. 9 is a diagram for a strain gage bridge circuit for a compression column load cell according to an embodiment of the invention.

FIG. 9 shows a diagram for a strain gage bridge 45 according to an embodiment of the invention. A full set of strain gages 32, 33, 33' in each composite strain gage element 30L', 30T' forms each bridge arm A–C, C–B, B–D, D–A. Two compensation strain gages 33, 33' from different strain gage elements 30L', 30T' meet at each bridge corner A, B, C, D. Trimming resistors 42, 44, 46, 48 are connected as shunts across each pair of compensation strain gages 33, 33' at each bridge corner. Modulus compensation gages M and semiconductor linearizing gages S bonded to the center section 15 of the column 12,12' are connected in series with the power terminals + and − as is known in the art. A pair of equal resistors 62, 62' for zero adjustment can be connected as shown in full lines for one polarity of zero adjustment, or as shown in dotted lines for opposite polarity of zero adjustment. Calibration resistors for load cell sensitivity, which will be connected to the output terminals B–D, are not shown.

When all four trimming resistors 42, 44, 46, 48 are short-circuited, the strain gage bridge 45 is essentially equal to the prior art strain gage bridge 35. The trimming resistors only add low resistances in series with the power supply and output signal terminals, but do not affect the bridge balance.

If the load cell 10, 20 with all trimming resistors 42, 44, 46, 48 shorted is loaded first with an axial load, and then with an off-axis load affecting the longitudinal strain gage elements 30L', a loading error will show up as a change in the output signal. The polarity of the error may indicate that the strain gage 32– in bridge arm A–D has higher sensitivity than the strain gage 32– in bridge arm C–B. This error can be compensated by increasing the resistance in trimming resistors 42 and 48, which adds a small positive signal from compensation strain gages 33+ and 33'+ to the negative signal from strain gage 32– in bridge arm A–D. The amount of the correction can be adjusted by changing the resistance in the trimming resistors 42 and 48 until full correction is achieved. Trimming resistors 42 and 48 also affect signals from strain gages 33'– in bridge arms A–C and B–D, but these effects cancel each other.

A similar off-axis load test across the transverse strain gage elements 30T', with trimming resistors 42, 48 shorted, may indicate that strain gage 32+ in bridge arm A–C has higher sensitivity than strain gage 32+ in bridge arm B–D. This can be compensated as explained above by increasing the resistance in trimming resistors 44 and 42. The shorting of trimming resistor 48 is then removed, and trimming resistor 42 is re-adjusted to restore compensation.

A compensation process as described above can always compensate for any loading errors of both polarities across both the longitudinal strain gage elements 30L' and the tangential strain gage elements 30T' on the compression column 12, 12'. The trimming resistors may affect the sensitivity of the load cell slightly, but this change will be well within the range of the regular calibration adjustment for a load cell. A subsequent zero adjustment with balanced trimming resistors 62, 62' as shown in FIG. 9 will not affect the compensation for loading errors.

Selecting the proper values for the four trimming resistors 42, 44, 46, 48 can be done by trial and error, as described above. The adjustment of the trimming resistors is a simple process, which do not require a high skill level.

The selection of individual trimming resistors can also be computer aided. In this case, all trimming resistors are first shorted out as described above, and three standardized loading tests described above are performed. A computer program supplied with the test data can then calculate correct values for all trimming resistors, assuming that the strain gage data and the location of all strain gages are known.

A load cell with the two composite strain gage elements 30L' and 30T' shown in FIGS. 6 and 7 can have all three strain gages 32, 33, 33' aligned with the central plane 13 of the compression column. The compensation strain gages 33, and 33' will, however, be located a small distance from the vertical center of the side faces of the center section 15.

The longitudinal and transverse strain gage elements 30L' and 30T' shown in FIGS. 6 and 7 can also be turned by 90°, so they become respectively transverse and longitudinal strain gage elements. A load cell with the two composite strain gage elements 30L' and 30T' turned by 90° can have all three strain gages 32, 33, 33' aligned with the vertical center of each lateral face of the center section. The compensation strain gages 33, and 33' will, however, be located a small distance from the center plane 13.

Figure 8:
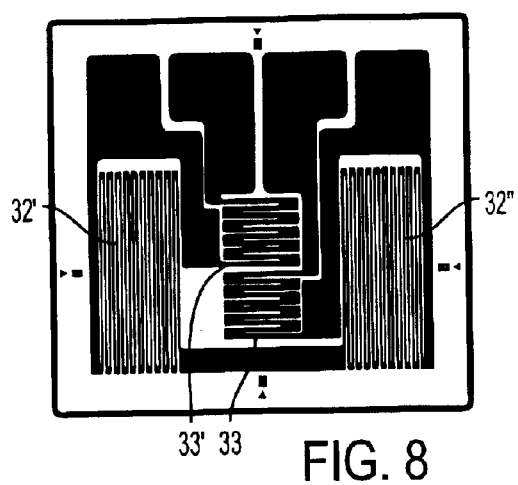
FIG. 8 is an enlarged view of an alternative design for a composite strain gage element according to an embodiment of the invention.

FIG. 8 shows an enlarged view of another embodiment of a composite strain gage element 30". This composite strain gage element 30" can be used both as a longitudinal strain gage element 30L" as shown, and as a transverse strain gage element 30T" when it is turned by 90°, with near ideal strain gage alignment in both cases. The main strain gage 32 is split into two halves, 32' and 32", and the two compensation strain gages 33, 33' are located between the two halves 32', 32" of the main strain gage 32. The main strain gage 32 will be centered over the central plane 13, with the two compensation strain gages 33, 33' adjacent to the central plane 13 when this element is used as a longitudinal strain gage element 30L". When it is used as a transversal strain gage element 30T", the two compensation strain gages 33, 33' will be close to the central plane 13, while the two halves of the main strain gage 32', 32" are located equidistant from the central plane 13.

The strain gage element 30" shown in FIG. 8 is made by etching a pattern in metal deposited on a plastic sheet. The black areas are conducting metal, which forms both the strain gages 32', 32", 33, 33' and all interconnections and solder terminals. The white areas are insulating plastic material where the metal has been etched away. The etching process makes it possible to make a composite strain gage element 30" as shown in FIG. 8 for essentially the same cost as a simple strain gage element 30 used in the prior art.

FIGS. 1 and 2 show compression columns 12, 12' with square center sections 15. This design makes it easy to locate the strain gage elements 30L and 30T symmetrically on the compression column, so it is commonly used. The invention will, however, not be affected by differently shaped cross sections. Changes may be made in the embodiments described above without departing from the principle and spirit of the invention, the scope of which is defined in the appended claims and their equivalents.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A compression column strain gage load cell, comprising:
   a first strain gage arranged to measure a principal strain in the compression column; and
   a pair of second strain gages in orthogonal alignment with and arranged symmetrically to said first strain gage, said second strain gages having substantially lower resistance than said first strain gage.

2. A compression column load cell according to claim 1, wherein said first strain gage is electrically connected between said pair of second strain gages.

3. A compression column load cell according to claim 1, wherein four first strain gages are distributed around the periphery of the compression column and arranged alternately to measure longitudinal and transverse strain.

4. A compression column load cell according to claim 2, wherein four sets of first and second strain gages are distributed around the periphery of the compression column, with the first strain gages oriented to measure alternately longitudinal and transverse strain.

5. A compression column load cell according to claim 4, wherein said four sets of strain gages are connected to form a bridge circuit with two second strain gages at each bridge corner, and further comprising trimming resistors shunting each pair of two second strain gages at each bridge corner.

6. A compression column load cell according to claim 2, wherein said first strain gage comprises two parallel strain gages arranged symmetrically with respect to said pair of second strain gages, and wherein all of said strain gages are formed as one composite strain gage.

* * * * *